United States Patent [19]

Yeh et al.

[11] Patent Number: 5,085,815
[45] Date of Patent: Feb. 4, 1992

[54] PROCESS OF RECOVERING AND CONVEYING SHAPED POLYMER EXTRUDATE

[75] Inventors: Richard C. Yeh, Westfield; Shiaw T. Ju, Edison, both of N.J.

[73] Assignee: Exxon Chemical Patents Inc., Linden, N.J.

[21] Appl. No.: 456,807

[22] Filed: Dec. 26, 1989

[51] Int. Cl.$^5$ .................... B29B 9/00; B29C 47/00
[52] U.S. Cl. .................... 264/142; 34/10; 264/349
[58] Field of Search .................. 264/141, 142, 349; 425/309, 311; 34/10

[56] References Cited

U.S. PATENT DOCUMENTS

| | | | |
|---|---|---|---|
| 3,285,163 | 11/1966 | Burner | 100/98 R |
| 3,323,222 | 6/1967 | Skidmore et al. | 264/142 X |
| 3,382,538 | 5/1968 | Burner | 425/196 |
| 3,393,425 | 7/1968 | Irving | 425/86 |
| 3,415,917 | 12/1968 | Watanabe | 264/142 |
| 3,574,891 | 4/1971 | Bredeson et al. | 425/192 R |
| 3,578,740 | 5/1971 | Redding et al. | 425/84 |
| 3,645,200 | 2/1972 | Craddock et al. | 100/98 R |
| 3,874,835 | 4/1975 | Rossiter et al. | 425/306 |
| 3,973,890 | 8/1976 | Porter et al. | 425/144 |
| 4,185,057 | 1/1980 | Rossiter et al. | 264/142 X |
| 4,413,971 | 11/1983 | Nettleton | 264/142 X |
| 4,465,451 | 8/1984 | Adderley, Jr. | 264/142 X |
| 4,508,592 | 4/1985 | Kowalski | 159/2.1 |

FOREIGN PATENT DOCUMENTS

| | | | |
|---|---|---|---|
| 55-154112 | 12/1980 | Japan | 264/142 |
| 56-4416 | 1/1981 | Japan | 264/142 |
| 2166141 | 4/1986 | United Kingdom . | |

OTHER PUBLICATIONS

English-Language Translation of Japanese Reference 55-154,112 (Published 12/80).
"New developments in mechanical drying of non-rigid elastomers" by Hertel et al., Dechema Monograph, 73 (1410-1431), 61-73, 1974.
Abstract of Belgium 883,702 (12/80).
Abstract of German Dem. Rep. 258,333 (7/88).
Abstract of Fed. Rep. Germany 1,454,749 (6/73).
Abstract of Fed. Rep. Germany 1,454,863 (4/69).
Abstract of Netherlands 66.06089 (11/67).
Abstract of U.S.S.R. 1,242,386 (7/86).
Abstract of U.K. 1,112,624 (5/68).

Primary Examiner—Leo B. Tentoni
Attorney, Agent, or Firm—H. L. Cohen

[57] ABSTRACT

A process for the recovery of dry polymer, wherein a polymer material containing water and/or volatile hydrocarbons is extruded through a die sleeve, cut into particles by means of a cutter mounted at the die discharge, and carried away from the cutter by an air stream. The die sleeve is provided with a plurality of die holes possessing a non-circular derived shape, which allow the material to be dried at lower temperatures and pressures. The cutter is a cage-type cylinder presenting large open areas for the flow of conveying air, thereby significantly reducing the local air velocity through the cutter and tearing of the particles. A bypass is provided to insure sufficient air being present after the cutter region to prevent condensation and to provide crumb transportation through the transport conduit. The invention reduces the generation of fines and results in an increase in the average particle size.

14 Claims, 7 Drawing Sheets

PROCESS OF RECOVERING AND CONVEYING SHAPED POLYMER EXTRUDATE

BACKGROUND OF THE INVENTION

1. Field of the Invention

The invention broadly relates to a finishing process for elastomers. More particularly, the invention pertains to an apparatus for recovering dry polymer in porous crumb form by means of pressure extrusion at relatively low temperatures and pressures, and wherein the polymer extrudate shape is controlled. Furthermore, the invention provides means for conveying polymer extrudate in a manner which reduces crumb breakdown.

Conventional polymer recovery processes in elastomeric finishing operations involve drying elastomers, such as ethylene propylene rubber and butyl and halobutyl rubbers, in an extruder. The polymer, containing a certain percentage of water, typically is fed to an extruder comprising a rotating feed screw which pressurizes and heat plastifies the material upstream of a die means. The die means, which is mounted at the discharge end of the screw press, generally includes a number of die orifices through which the material is forced. As the material is exploded out through the die orifices, the water is flashed off and steam is released. A cutter disposed adjacent the discharge end of the die means cuts the extruded material into particles.

In order to remove water from the polymer, it is necessary to generate high temperatures and pressures at the extruder die. In order to obtain the requisite high temperature and pressure, a die plate with small round die orifices is typically utilized in conventional systems. The high temperature and pressure associated with such systems results in the proliferation of fines and reduces process line capacity for the finishing operation. Moreover, the conventional cutter typically possesses a plurality of radial blades rotating at high speeds. The design features of typical cutters, in conjunction with their high speed, tends to cut the extruded crumb, thereby contributing further to the production of fines, which are generally considered to be particles smaller than 2 mm in size. The high cutter speeds which conventional cutters must assume in order to avoid plugging contributes to higher fines generation.

An additional detriment associated with conventional extruder drying processes involves the conveying of the particulate material away from the cutter. In some conventional finishing processes, a pneumatic conveying system is employed to carry the particulate material away from the cutter to down-stream operations by means of a high velocity air stream. The high velocity of this air stream causes tearing and breakdown of the polymer crumb, thus creating undesirable fines. Indeed, the primary detriment to prior art cutters is the high pneumatic conveying velocity going through the cutter, which results in shearing and tearing of rubber crumb and generation of fines.

Fines are problematic to the rubber finishing operation from both process and product standpoints. Fines negatively impact the finishing process in that they easily and readily stick to and foul the pneumatic conveying system components, as well as equipment located downstream of the pneumatic conveyor. The fouling problems caused by the presence of fines leads to costly and interruptive down times for equipment cleaning and, indeed, may culminate in the need for component repair and/or replacement.

From a product standpoint, the influence of fines on the finishing process is equally undesirable. Fines which adhere to the hot surfaces of the process equipment will tend to degrade and contaminate the polymer. The extent of fines production in the finishing process thus raises serious concerns of product quality and integrity.

The present invention addresses and overcomes the deficiencies associated with conventional elastomer finishing processes by providing an integrated device for polymer extrudate shape control and conveying. According to the present invention, a novel die means presents a greater surface to volume ratio and shorter diffusion path than conventional extruder drying die means. The ranges of extruder temperature and pressure at or near entry to the die for conventional systems are typically 150° C. to 260° C. and 500–1800 psi for the same volatiles content standards of elastomers. The die means of the present invention is thus uniquely capable of achieving a degree of drying commensurate with conventional devices, but at lower temperatures and pressure, with an accompanying decrease in fines generation and an increase in line capacity.

A further aspect of the invention involves the use of a novel cutter means in association with the die means. This cutter means provides a larger open area for the conveying air stream as compared with conventional cutters. The cutter means of the present invention significantly lowers the local air velocity in the cutter and achieves a significant reduction in crumb breakdown due to tearing. Moreover, the cutter means of the present invention can be operated at a lower RPM than that required for conventional cutters. In particular, the improved cutter means of the present invention is operated at 50–600 RPM and preferably, from 50–250 RPM, as opposed to the manufacturer's recommendations of 1500–2400 RPM for conventional cutters.

Thus, the combined features of the present invention serve to reduce drying temperatures and pressures, to decrease air velocity through the cutter means, to produce larger average crumb size, to significantly diminish the amount of fines generated, and to eliminate fouling of the pneumatic conveying equipment and equipment downstream thereof. Indeed, the size of the crumb produced with the invention closely approaches the theoretically calculated value, thereby providing a mechanism for extrudate shape control.

2. Description of the Prior Art

Rubber drying processes utilizing pressure extruders and die means is known in the prior art. More specifically, the prior art discloses die means for rubber drying including a pair of concentric cylinders mounted normal to the extruder axis and being positionable with respect to each other in order to bring about varying degrees of alignment of die holes provided in each of the cylinders. For example, Porter et al U.S. Pat. No. 3,973,890, which issued on Nov. 8, 1983, and which is commonly owned by the assignee of the present invention, discloses an adjustable die face pelletizer mounted at the output end of a rubber drying extruder. The pelletizer is characterized by die plate means comprising a pair of nested cylindrical die plates operatively arranged for selective positioning with respect to each other. Each of the die plates is provided with a plurality of round die orifices which, by positioning the die plates, may be completely aligned, or may be caused to assume varying degrees of misalignment.

It is also known in the prior art to provide a rotatable cutter within the inner cylinder of a die means, and to direct a fluid such as air into the area of the cutter to carry away cut material. Such is also shown in the aforementioned patent to Porter et al, wherein a cylindrical cutter having radial helically extending blades is mounted concentrically within the inner die plate. A gas or liquid treatment fluid flushes the cut material away from the cutter.

Similarly, U.S. Pat. No. 4,413,971, which issued to Nettleton on Nov. 8, 1983, shows a rubber recovery apparatus comprising a fixed plate containing extrusion orifices, and within which is disposed a rotatable plate provided with extrusion apertures. An extrudate passes through the extrusion apertures, and is cut into pellets by means of rotating cutter blades which project radially from a solid cylindrical body. A compressed gas flows down between the blades to carry the pellets into another chamber. Similar die means and cutter means arrangements are shown in Rossiter et al U.S. Pat. Nos. 4,185,057 and 3,874,835, and Redding et al U.S. Pat. No. 3,578,740.

Various other prior art patents teach die means mounted at the discharge of an extruder, cutter means for cutting material forced through the die means and a conveying medium for transporting cut material from the cutter means. In Craddock et al U.S. Pat. No. 3,645,200, dated Feb. 29, 1972, the cutter means comprises a plurality of hub-mounted rotating blades. The cut material is propelled away by means of the cutter blades.

U.S. Pat. No. 3,574,891 of Apr. 13, 1971 to Bredeson et al teaches a mechanical screw press characterized by a circular die plate having an annular array of circular nozzle orifices associated with a cutter having radially extending knives. Steam is directed into the die plate.

U.S. Pat. No. 3,393,425, which issued on July 23, 1968 to Irving is directed to an apparatus for forming pellets wherein a screw feeds plastic material to the die orifices of a die and a rotary cutter cuts the extruded strands of material into pellets. The cut pellets are conveyed away from the cutter in a zig zag pattern by sprays of cooling fluid.

Burner U.S. Pat. No. 3,382,538 of May 14, 1968, shows a die plate with circular extrusion orifices and a rotatable cutter member positioned adjacent thereto. The cutter includes a series of teeth of spiral configuration, each of which has a knife member mounted thereon.

Several foreign patents are directed to conventional rubber extrusion processes, those being Soviet Union Patent 1242-386-A, Great Britain Patent 2 166 141 A and German Patent 1454749-R.

The prior art fails to teach or suggest a die means which provides a surface to volume ratio and diffusion path to enable degrees of drying commensurate with the conventional extruder drying processes but at lower temperature and pressure. Additionally, the prior art fails to show a cutter means which presents a large open area for conveying air so as to realize significant reductions in air velocity. The need exists, therefore, for a device possessing the latter features, and which achieves a reduction in fines generation and an increase in average crumb size in an elastomer finishing process.

SUMMARY OF THE INVENTION

The invention relates to a polymer recovery process wherein a polymer containing water and/or volatile hydrocarbons is fed to an extruder and forced through die means to remove at least a part of the water therefrom. A cutter means mounted at the die discharge cuts the extruded material, which is carried away from the cutter by a flow of air in a pneumatic conveying system.

The die means comprises a cylindrical die sleeve which is rotatable 360° within an outer fixed cylinder. The die sleeve is provided with a plurality of slit-shaped or cross-shaped die holes through which the material is forced. Rotation of the die sleeve with respect to an opening in the outer cylinder varies the number of the die holes or open area which are exposed to the extruded material. The die holes provide a larger surface to volume ratio than conventional round die holes, and thereby achieve drying of the material at lower temperatures and pressures, and with less fines generation, than are associated with conventional die means.

The cutter means comprises a cage-like hollow cylinder having a pair of circumferential end members, between which extend a number of longitudinal cutting blades. The blades are separated from each other by a large open area leading into the interior of the cutter. The hollow cutter and its open areas provide large spaces for the flow of conveying air through the cutter. The cutter means of the present invention thus allows the air velocity through the cutter to be reduced from around 100 ft/sec associated with conventional cutter means, to around 25 ft/sec. The latter feature reduces tearing of the product due to high air velocities, thereby reducing the presence of fines and increasing the average particle size obtained for the product.

Additionally, a bypass may be provided in the pneumatic conveying system whereby constant increased air flows may be utilized without an increase in the local air velocity through the cutter means.

DESCRIPTION OF THE PREFERRED EMBODIMENT

Figure 1:
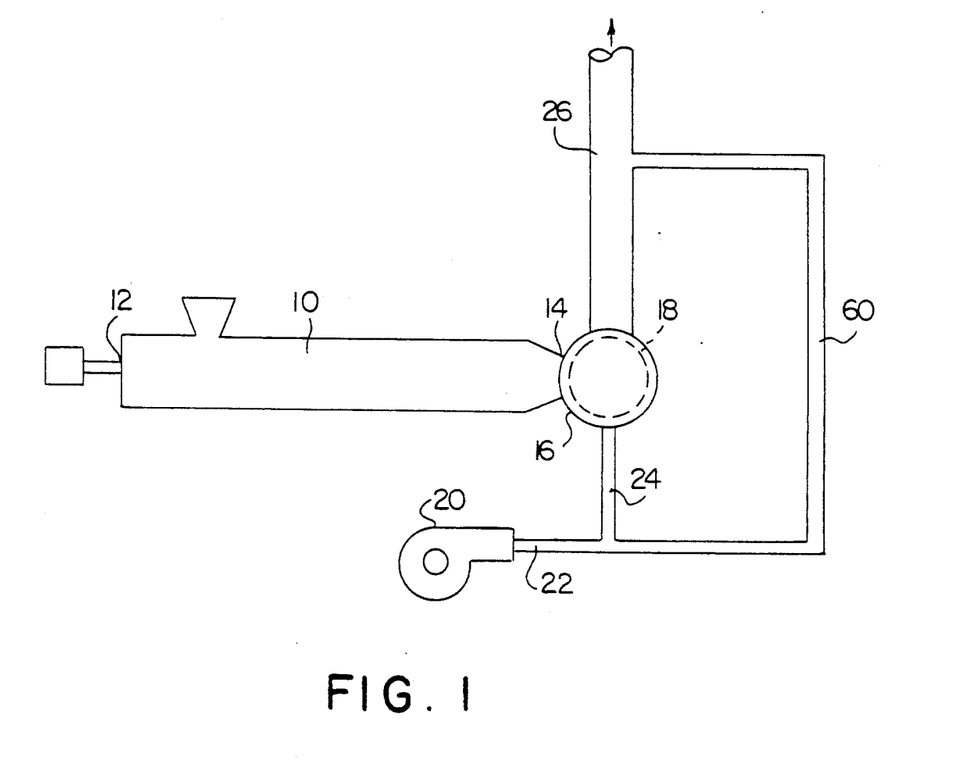
FIG. 1 is a top plan view of the apparatus of the present invention.

With reference to the drawings and, in particular, with reference to FIG. 1, the novel components of the invention are depicted as utilized in connection with a polymer finishing extrusion operation. FIG. 1 illustrates extruder 10 having an inlet side 12 and a discharge side 14. The extruder itself may be conventional in nature, preferably including a number of feed screws for heat plastifying a polymer material as part of an elastomer finishing process. According to such process, a polymeric material such as ethylene propylene rubber, butyl rubber or halobutyl rubber is fed to the inlet side of the extruder and is subjected to heat and pressure as it is directed from the inlet side to the discharge side.

A die means 16 in the form of a die sleeve is associated with the discharge side of the extruder. The die sleeve contains a number of die holes or orifices through which the pressurized heat plastified material is forced. As the material explodes through the die holes, water and/or volatile hydrocarbons contained in the material is flashed off, resulting in a dewatering/drying of the material. Material which has flowed through the die holes and been dewatered is cut into small particles or pellets by means of a rotating cutter means 18 mounted concentrically within the die sleeve.

A source 20 of conveying fluid directs a carrying medium, preferably air, by means of conduits 22 and 24 into the cutter means, whereby the cut or pelletized material is transported away from the cutter means into transporting conduit 26 and, thereafter, to downstream operations.

In a typical elastomer finishing process, the die means through which the heat plastified material is forced is provided with a plurality of round die holes. Additionally, the cutter means in a conventional elastomer extruder drying process consists of a solid cylinder having a plurality of radially extending blades. The cylinder, and hence the blades, typically rotate at very high speeds, i.e. 1500 to 2400 RPM. Moreover, in conventional systems utilizing pneumatic conveying means, the minimum air velocity through the cutter means is 100 ft/sec. The latter requirement is dictated by cutter design, and by the fact that, at lower air flows, the risks of line fouling in the pneumatic conveying system become prohibitive.

As previously noted herein, the round die holes of the die means, the high speed solid cylindrical cutters, and the high air velocities of the pneumatic conveyor found in prior art polymer recovery systems have adverse impacts upon process and product. In order to achieve adequate drying by reducing the water content of a rubber material from an initial 5 to 15% by weight to a water content of around 1 to 3% by weight, high temperatures and pressures must be generated in the material. Typical ranges for extruder temperature and pressure at or near entry to the die are 150° C. to 260° C. and 500 to 1800 psi. For this reason, small round die holes are typically utilized in the die means of conventional devices to provide a constriction for the material sufficient to produce the necessary high temperatures and pressures for drying.

The aforementioned high drying temperatures result in the material being very hot and sticky, leading to equipment fouling and plugging problems in the cutter means and in the downstream pneumatic conveying system. Furthermore, the very hot and tacky particles created by the cutter means tend to agglomerate, making it difficult, if not impossible, to control the size of the pellets or crumb and, thus, the quality of the final product.

The high speed solid cylindrical cutter means of prior art devices further contribute to process and product deficiencies. In particular, the high rotational speed of conventional cutter means, together with their radial blades, tend to cut or splinter the particles, thereby resulting in the production of fines. Fines are likely to stick to the pneumatic conveying system pipes, thus causing fouling problems and, should the stuck fines degrade, contamination of the product is likely to ensue.

Figure 7:
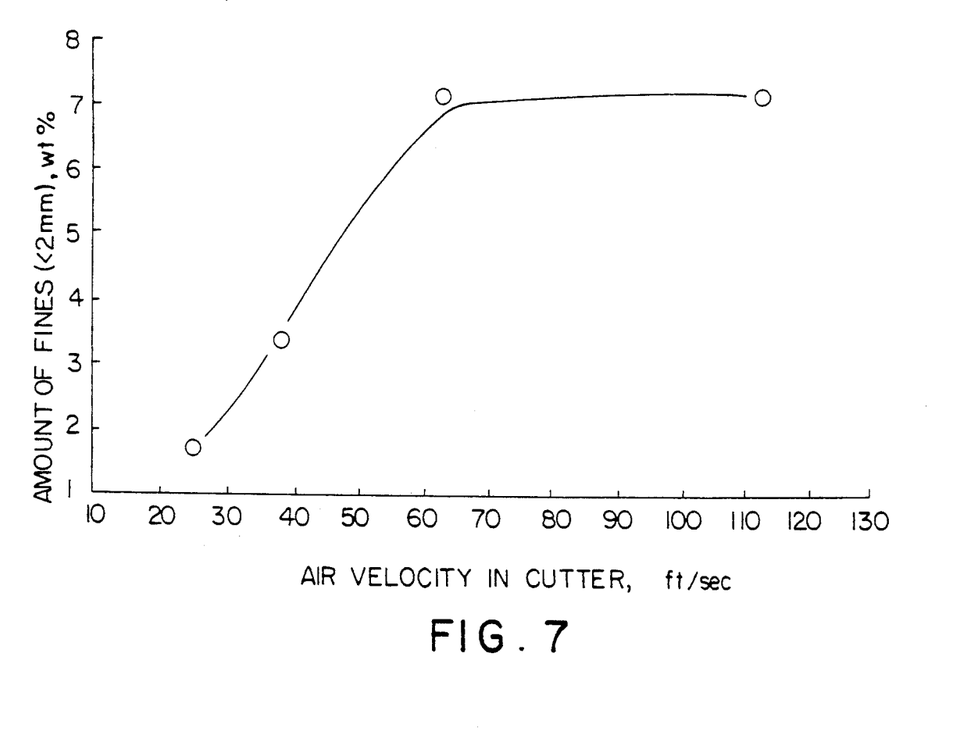
FIG. 7 is a graph showing the relationship between the air velocity in the cutter means and the production of fines.
Figure 8A:
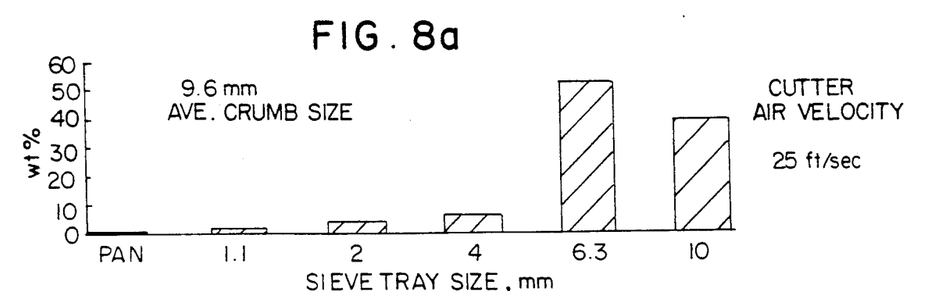
FIGS. 8a, 8b, 8c and 8d a series of graphs showin the relationship between crumb size and cutter air velocity for the conditions described in Example 3.
Figure 8B:
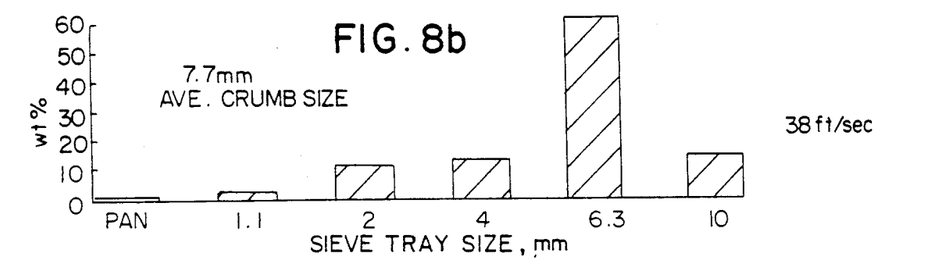
Figure 8C:
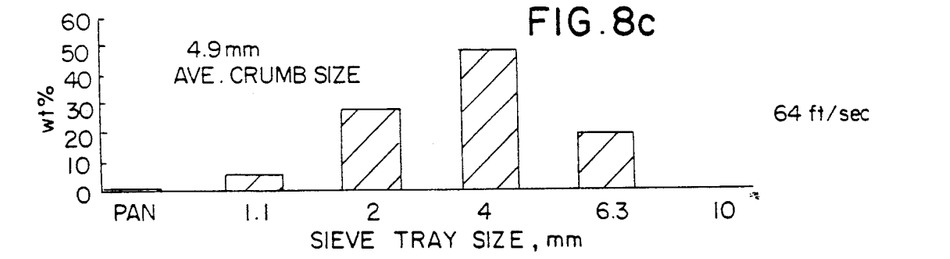
Figure 8D:
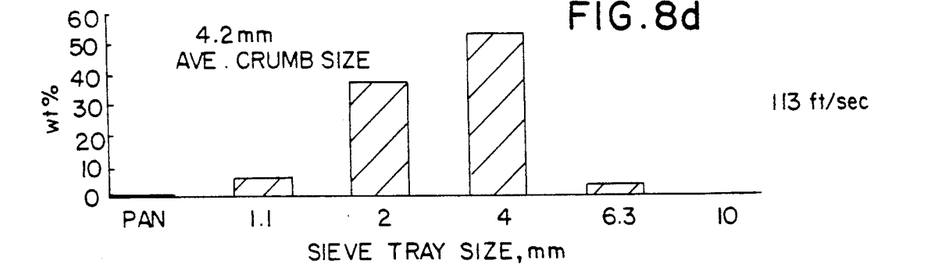

Because conventional cutter means are essentially solid cylindrical members, they provide little open area for the flow of air. Therefore, the local air velocity through the cutter means for the pneumatic conveying system must be very high in order to carry the particles away from the cutter to downstream operations. Consequently, the minimum air flow for conventional pneumatic conveying equipment in a rubber finishing process is 100 ft/sec. The local high air velocity through the cutter means arising from such speeds tears the rubber crumb and thus represents a further source of fines. FIG. 7 graphically depicts the quantified relationship between air velocity in the cutter and the presence of fines, i.e. particles smaller than 2 mm. As can be seen from the graph, the weight percent of fines for air velocities of around 100 ft/sec is 7%. When the air velocity in the cutter is around 25 ft/sec, on the other hand, fines comprise less than 2% by weight of the material. In addition to generating fines, the cutting and tearing of the crumb due to the cutter means and conveying air flow limits the size of crumb that is able to be produced and results in product size and shape control difficulties.

Figure 2:
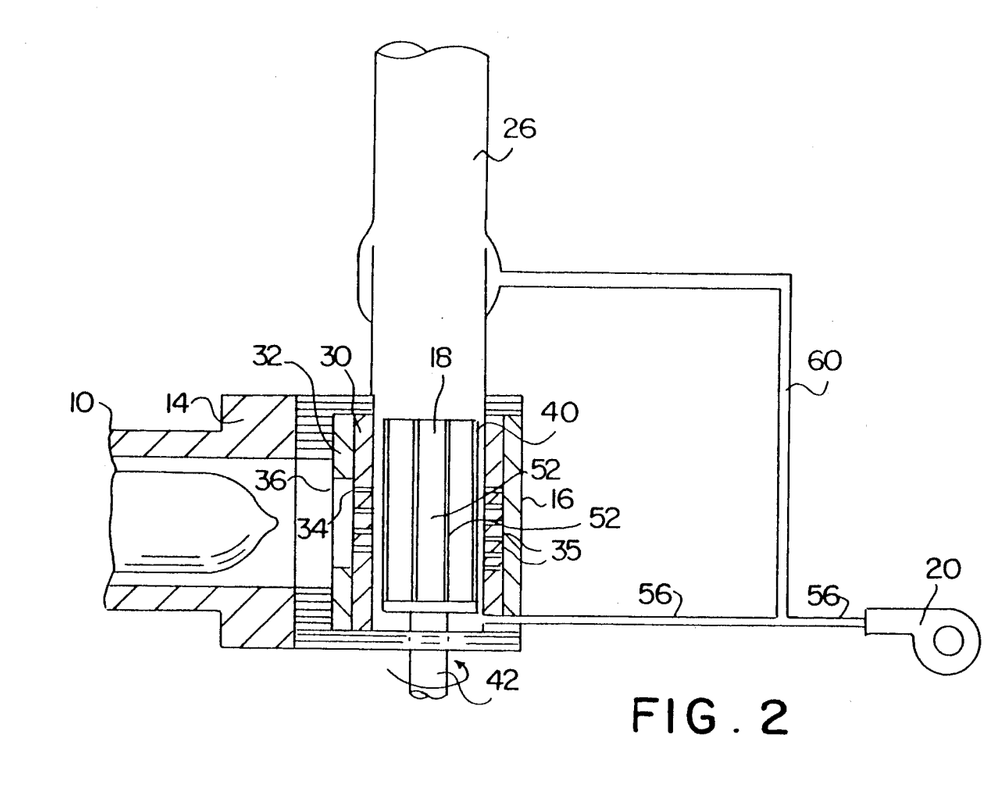
FIG. 2 is a fragmentary side cross-sectional view of the die means, cutter means and conveying means of the present invention.

The die means 16 of the present invention departs from prior art devices by utilizing a unique die sleeve and die holes which achieve the same degree of drying as conventional devices, but at lower temperatures and pressures. As best shown in FIG. 2, the die means 16 is mounted at the discharge side 14 of extruder 10. The die means comprises a cylindrical die sleeve 30, which is mounted concentrically within an outer fixed cylindrical sleeve 32 normal to the longitudinal axis of the extruder. The die sleeve is rotatable over a range of 360° around its longitudinal axis.

Figure 3:
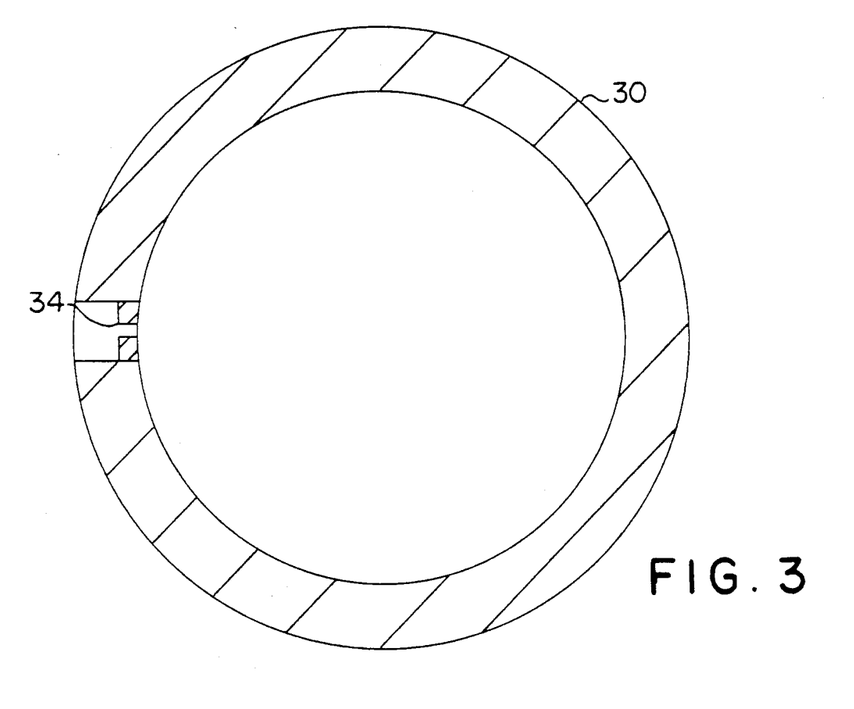
FIG. 3 is a top plan view of the die sleeve means of the present invention.
Figure 4:
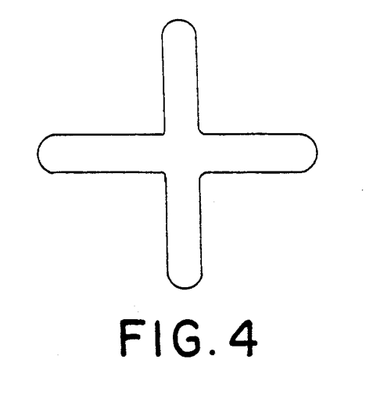
FIG. 4 is a cross-sectional view of the die holes of the die sleeve means of FIG. 3.
Figure 5:
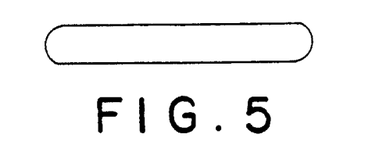
FIG. 5 is a cross-sectional view of a first alternative embodiment for the die holes of the die sleeve means of FIG. 3.

As most clearly depicted in FIGS. 2 and 3, a plurality of discrete die holes 34 are provided in the die sleeve, the preferred configuration for such holes being illustrated in FIGS. 4 and 5. The die holes, which provide communication between the discharge side of the extruder to the interior of the die sleeve, may be of a cross-shaped cross-sectional configuration as shown in FIG. 4, or they may assume the slit-shaped cross-sectional configuration of FIG. 5.

Figure 9:
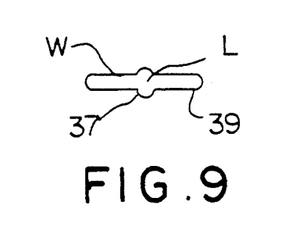
FIG. 9 is a cross-sectional view of a second alternative embodiment for the die holes of the die sleeve means of FIG. 3.

FIG. 9 illustrates an alternative embodiment for the die hole configuration. Although the die hole configuration depicted in FIG. 9 may be characterized as being cross-shaped, the vertical member 37 of the die hole is not as large as the vertical member of the die hole of FIG. 4. In fact, the length L of the vertical member 37, as shown in FIG. 9, can range from two to five times the width W of the horizontal member 39.

The outer sleeve 32 is provided with an opening or window 36 disposed adjacent the discharge side of the extruder and in alignment with and overlying the die holes 34. In this manner, heat plastified material is directed from the discharge side of the extruder through the opening 36 and is forced under pressure through the die holes 34. Because the die sleeve is rotatable over 360°, the die holes in the die sleeve may be rotated to a position where they are only partially aligned with the opening in the outer sleeve, some of the die holes being covered by the outer sleeve. The exact degree of partial alignment depends upon the position adapted for the die sleeve with respect to the outer sleeve and thus provides a means for varying the number of die holes exposed to the extrudate. Various opening sites may be selected for the outer sleeve, with opening size being shaped so that the diameter at the inner wall of the outer sleeve is at most equal to the outer diameter of the inner sleeve. The die means is thus able to accommodate a wide range of process conditions and materials. Moreover, the fact that the die sleeve is rotatable makes it possible for one sleeve to contain both types of die holes, as shown by the second series of die holes 38 in FIG. 2, with utilization of the desired series of holes being accomplished by rotation of such holes into full or partial alignment with the opening in the outer sleeve. It should be noted that the die holes may be provided in the die sleeve in an arrangement of rows or the like, so that rotation of the die sleeve with respect to the opening in the outer sleeve may easily serve to vary the number of holes presented to the extruded material.

The slit-shaped and cross-shaped die holes have a greater surface to volume ratio as compared to the round die holes of conventional die means. For instance, comparing a conventional die hole to one embodiment of this invention, each having approximately the same corss-sectional area, conventional die hole circumference to die hole cross-sectional area=0.8 for a cylindrical hole of 5 mm diameter, whereas die hole perimeter to die hole cross-sectional area=2.1 for a cross die of 1×10.5 mm. Additionally, the die hole configurations of the invention present a shorter diffusion path for volatiles mass transfer. The shorter the diffusion path, the faster the drying rate. In other words, at constant velocity over a shorter path, more volatile can escape. The latter relationship translates into lower drying temperature for the die means of the invention.

The foregoing features enable the die means of the present invention to realize the same degrees of drying associated with conventional devices, i.e. obtaining a water content of 1 to 3% by weight of material from an initial water content of 5 to 15%. However, the die means of the instant invention is able to obtain commensurate degrees of drying at lower temperature, i.e. 120° C. to 245° C., and pressure, i.e. 400–1750 psi, than that required in conventional devices which, respectively, reduces fines generation and increases line capacity.

Figure 6:
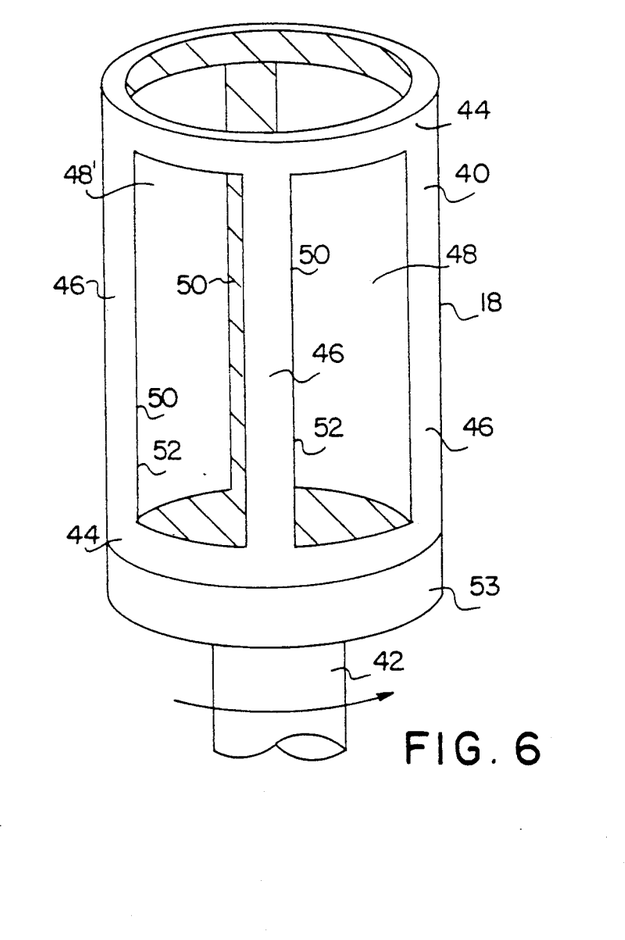
FIG. 6 is a perspective view of the cutter means of the present invention.
Figure 14:
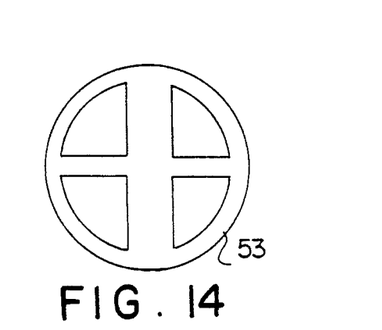
FIG. 14 is a top view of a first alternative embodiment for the cutter support member shown in FIG. 6.

As best illustrated in FIGS. 1 and 2, the cutter means 18 is mounted for rotation within the die sleeve. The structural details of the cutter means are most clearly depicted in FIGS. 2 and 6, wherein it can be seen that the cutter means comprises a cage-type hollow cylinder 40 mounted on rotatable shaft 42. The cutter means is defined by circumferential end members 44, between which extend discrete longitudinal members 46 separated from each other by an open area 48 which is wider than the width of the longitudinal members. One of the end members 44 is attached to a cutter support member 53, by means of which the cylinder 40 is secured to the rotatable shaft 42. The support member 53 may be provided with perforations or voids so that the passage of air is only minimally impeded, as shown in the alternative embodiments of FIGS. 14 and 15. At least one of the side edges 50 of each longitudinal member is provided with a cutting blade 52.

Figure 15:
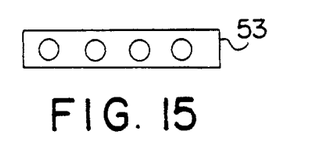
FIG. 15 is a side view of a second alternative embodiment for the cutter support member shown in FIG. 6.

As best depicted in FIG. 2, the cutter means 18 is mounted concentrically within the die sleeve at the outlet of the die holes such that the rotating blades 52 continuously cut the strands of material which are extruded through the holes into smaller particles. A source 20 of conveying fluid, preferably air, directs a flow of air through supply conduit 56 and into the cutter means. Because the cutter 40 is hollow, and is provided with large open areas 48 between the smaller width longitudinal members, it presents a great deal of space for the flow of air through and around the cutter. The perforated base member 53 similarly presents open area for the flow of air. This flow of air serves to carry the cut particles away from the cutter and into transporting conduit 26, wherein the material is carried pneumatically to downstream operations. The conduit 26 may be provided with a cooling water jacket, if desired, to provide some wall condensation for minimizing downstream line fouling risks. It should be noted that the air supply may be introduced or injected perpendicular to the rotatable shaft, but at a point or points above the base member 53, in which case base member 53 may be like FIG. 14 rather than perforated (FIG. 15).

The larger open areas for air flow associated with the cutter means 18 result in a significant reduction in the local air velocity through and around the cutter, as compared with prior art cutters which generally obstruct the flow of air and thus require higher air velocities to convey the cut particles. As noted herein, the latter high air velocities which, at a minimum, are around 100 ft/sec, tear the particles of material so as to generate undesirable fines. In contrast, air flow through the cutter means of the present invention is in the range of 20 ft/sec to 100 ft/sec and, preferably, around 25 ft/sec.

As shown in the graph of FIG. 7, the amount of fines present in the material when air velocity in the cutter is 25 ft/sec is less than 2% by weight, while the amount of fines present when the air velocity through the cutter is 100 ft/sec is around 7% by weight. It is apparent, therefore, that the lower air velocities achieved with the present invention significantly eliminates the problem of fines production associated with prior art cutter devices.

There may be wall condensation along the transporting conduit 26. In such cases, it may become necessary to control the condensation by increasing the air flow through the system. The invention allows the air flow to be increased, while maintaining a low local air velocity in the cutter, by means of an air bypass 60 shown in FIGS. 1 and 2. As is most clearly depicted in FIG. 2, the air bypass intersects the supply conduit 56 and the transporting conduit 26, and serves to direct a portion of the inlet air from supply conduit 56 directly into transporting conduit 26 downstream of the cutter and without flowing through the cutter. The total air flow may be increased, therefore, without an increase in the local air velocity through the cutter.

Figure 10:
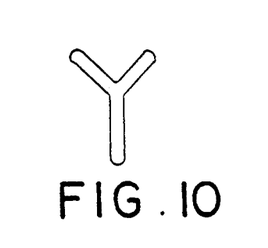
FIG. 10 is a cross-sectional view of a third alternative embodiment for the die holes of the die sleeve means of FIG. 3.
Figure 11:
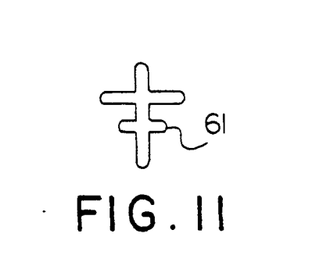
FIG. 11 is a cross-sectional view of a fourth alternative embodiment for the die holes of the die sleeve means of FIG. 3.

The cross die geometry for the die holes is not limited to the design illustrated in FIG. 4, and several alternative geometries are illustrated in FIGS. 9, 10 and 11. FIG. 9, as previously discussed, shows a modified version of the cross die hole of FIG. 4. FIG. 10 illustrates a die hole of generally Y-shaped cross-sectional configuration. FIG. 11 depicts a cross-shaped die hole having an additional perpendicular "cross", or passage 61.

Figure 12:
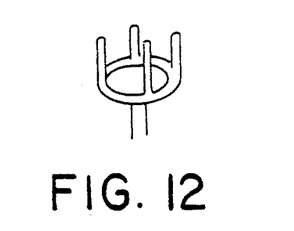
FIG. 12 is a perspective view of a first alternative embodiment for the cutter means of the present invention.
Figure 13:
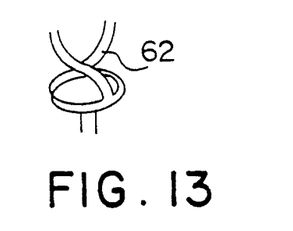
FIG. 13 is a perspective view of a second alternative embodiment for the cutter means of the present invention.

Furthermore, the shape of the cage cutter may assume various forms, and additional embodiments are depicted in FIGS. 12 and 13. More particularly, the cage cutter of FIG. 12 is characterized by the elimination of the top end member, and the cage cutter of FIG. 13 is characterized by helical blades 62.

The invention will now be described in connection with several Examples, with Example 1 representing a conventional process.

EXAMPLE I

Polymer having a water content of 7.5% by weight was fed at 8.5 Klb/hr to an extruder having die means with 115 round die holes 3 mm in diameter Extruder die temperature was 473° F. and extruder pressure was 880 psi. A standard rotary cutter at 310 rpm cut the extruded material into particles. The particles were transported by a water jacketed pneumatic conveyor, wherein the total air flow, including cutter and bypass, was 7,250 lb/hr, the air flow through the cutter was 5,100 lb/hr, and the air velocity in the cutter was around 100 ft/sec. The weight percent of fines measured at the pneumatic conveyor exit, fines being particles smaller than 2 mm, was greater than 20%, and the average crumb size was 3 mm.

EXAMPLE 2

Polymer having a water content of 7.5% by weight was fed at 8.5 Klb/hr to an extruder having die means with 80 1×10 mm cross-shaped die holes. Extruder die temperature was 419° F. and extruder pressure was 810 psi. A cage-type cutter rotating at 250 rpm cut the extruded material into particles. The particles were transported by a water jacketed pneumatic conveyor, wherein the total air flow, including cutter and bypass, was 7,250 lb/hr, the air flow through the cutter was 1,610 lb/hr and the air velocity in the cutter was around 29 ft/sec. The weight percent of fines measured at the pneumatic conveyor exit, fines being particles smaller than 2 mm, was around 8%, and the average crumb size was 6.5 mm.

EXAMPLE 3

Polymer having a water content of 7% by weight was fed at 285 lb/hr to an extruder having die means with 12 1×10.5 mm cross-shaped die holes. Extruder die temperature was 280°. A cage-type cutter rotating at 225 rpm cut the extruded material into particles. The particles were transported by a water jacketed pneumatic conveyor, wherein the total air flow, including cutter and bypass, was 360 to 1650 lb/hr, the air flow through the cutter was 360 to 1650 lb/hr, and the air velocity in the cutter was 25 to 113 ft/sec.

FIG. 8 graphically depicts the relationship of particle size and average crumb size to cutter air velocity for the 25 to 113 ft/sec range described in Example 3. As can be seen from FIG. 8, the average crumb size increases well more than two-fold as the cutter air velocity decreases from 113 ft/sec. to 25 ft/sec. Moreover, the weight percent of particles smaller than 2 mm and 4 mm increases dramatically at the higher cutter air velocities.

It is apparent from a comparison of Examples 2 and 3, with the conventional process and equipment of Example 1, that the present invention requires lower extruder temperature and pressure, and allows for a reduction in air velocity through the cutter, so as to obtain a significantly larger average crumb size and a dramatic reduction in fines.

Although the invention has been described in connection with a preferred embodiment, it should be noted that various modifications and additions may be made to the invention described herein without departing from the spirit and the scope of the invention as defined in the appended claims.

What is claimed is:

1. A method of recovering and conveying shaped polymer extrudate comprising the steps of extruding a polymer containing water in an extruder;
passing the extruded polymer through a die sleeve to dewater the extruded polymer,
said die sleeve including a cylindrical surface and a plurality of die openings of non-circular derived cross-sectional configuration formed in said cylindrical surface through which the extruded polymer is passed;
cutting the dewatered polymer with a rotatable cutter mounted concentrically in said die sleeve,
said cutter including a body having a cylindrical surface, an open interior, a plurality of cutting openings formed in said cutter cylindrical surface communicating with said cutter open interior to define cutting blades for cutting the dewatered polymer and at least one opening in said body in communication with said open interior for receiving a flow of gas; and
causing gas to flow through said opening into said open interior to carry the cut dewatered polymer away from said cutter.

2. A method of recovering and conveying shaped polymer extrudate as recited in claim 1 wherein said die openings define a slit-shaped cross-sectional configuration.

3. A method of recovering and conveying shaped polymer extrudate as recited in claim 1 wherein said die openings define a cross-shaped cross-sectional configuration.

4. A method of recovering and conveying shaped polymer extrudate as recited in claim 1 wherein said cutting blades extend longitudinally on said body.

5. A method of recovering and conveying shaped polymer extrudate as recited in claim 4 wherein said body includes a central longitudinal axis and said cutting blades are disposed parallel to said axis.

6. A method of recovering and conveying shaped polymer extrudate as recited in claim 4 wherein said cutting blades are disposed helically on said body.

7. A method of recovering and conveying shaped polymer extrudate as recited in claim 1 wherein gas is caused to flow through said cutter at a velocity of approximately 25 ft/sec.

8. A method of recovering and conveying shaped polymer extrudate as recited in claim 3 wherein each of said die openings includes a horizontal component having a length and a width and a vertical component having a length and a width, and said vertical component length is approximately two to five times said horizontal component width.

9. A method of recovering and conveying shaped polymer extrudate comprising the steps of extrudating a polymer containing water in an extruder;

forcing the extruded polymer through a die sleeve to dewater the extruded polymer, said die sleeve including a cylindrical surface and a plurality of die openings of non-circular derived cross-sectional configuration formed in said cylindrical surface through which the extruded polymer is forced;

cutting the dewatered polymer with a rotatable cutter mounted concentrically in said die sleeve, said cutter including a hollow body having a cylindrical surface, a plurality of cutting blades defined in said cylindrical surface extending longitudinally therealong, a plurality of cutting openings formed through said cylindrical surface separating said cutting blades and at least one opening in said body for allowing gas to flow into said body; and supplying gas to flow through said at least one opening into and around said body to carry the cut dewatered polymer away from said cutter.

10. A method of recovering and conveying shaped polymer extrudate as recited in claim 9 wherein said cutting blades include a width and said cutting openings include a width and said width of said cutting blades is less than said width of said cutting openings.

11. A method of recovering and conveying shaped polymer extrudate as recited in claim 10 wherein said step of supplying gas includes supplying a flow of gas to said cutter through a supply conduit communicating with said cutter.

12. A method of recovering and conveying shaped polymer extrudate as recited in claim 11 further including the step of transporting the cut dewatered polymer away from said cutter in a transporting conduit communicating with said cutter.

13. A method of recovering and conveying shaped polymer extrudate as recited in claim 12 further including the step of directing a portion of the flow of gas in said supply conduit to said transporting conduit in a bypass conduit connecting said supply conduit and said transporting conduit without passing said portion of the flow of gas through said cutter.

14. A method of recovering and conveying shaped polymer extrudate as recited in claim 13 wherein said cutter further includes a support plate mounting said body on a rotatable shaft and said at least one opening is formed in said support plate to allow gas from said supply conduit to flow into said cutter.

* * * * *